Feb. 21, 1956     J. P. HUFNAGEL     2,735,217

FLY SWATTER

Filed May 19, 1953

John P. Hufnagel
INVENTOR.

United States Patent Office 2,735,217
Patented Feb. 21, 1956

2,735,217

FLY SWATTER

John P. Hufnagel, Mansfield, Pa., assignor of fifty per cent to Percy A. Coles, Mansfield, Pa.

Application May 19, 1953, Serial No. 355,941

2 Claims. (Cl. 43—137)

The present invention relates to an improved fly swatter, and the object of the invention, generally speaking, is to structurally, functionally and otherwise improve upon conventional-type fly swatters.

The ordinary fly swatter has a perforated and usually permanently attached head, that is, the head is integral or approximately so with the outer end of the elongated handle. Not only does the head become frayed and out-of-order, it becomes soiled, unsightly and unsanitary. The object of the instant invention is to provide a fly swatter wherein a replaceable sanitized head is provided.

More specifically, the invention has to do with handle means having a hand grip at one end and having an expansible and contractible head adapter frame at its outer end, the head being in the form of an envelope which fits removably over the adapter frame and said envelope being made of throw-away or disposable heavy manila or equivalent paper which is treated with an appropriate germicide.

In carrying out the invention, there are two principal parts one part being an attachable and detachable head unit, which is simply an envelope, and the other a handle unit, which, as stated, has a hand grip at one end and is preferably constructed from wire with the limbs or ends of the wire constructed in a unique way to provide an expansible and contractible adapter frame.

Other objects, features and advantages will become more readily apparent from the following description and the accompanying sheet of drawings.

Figure 1:
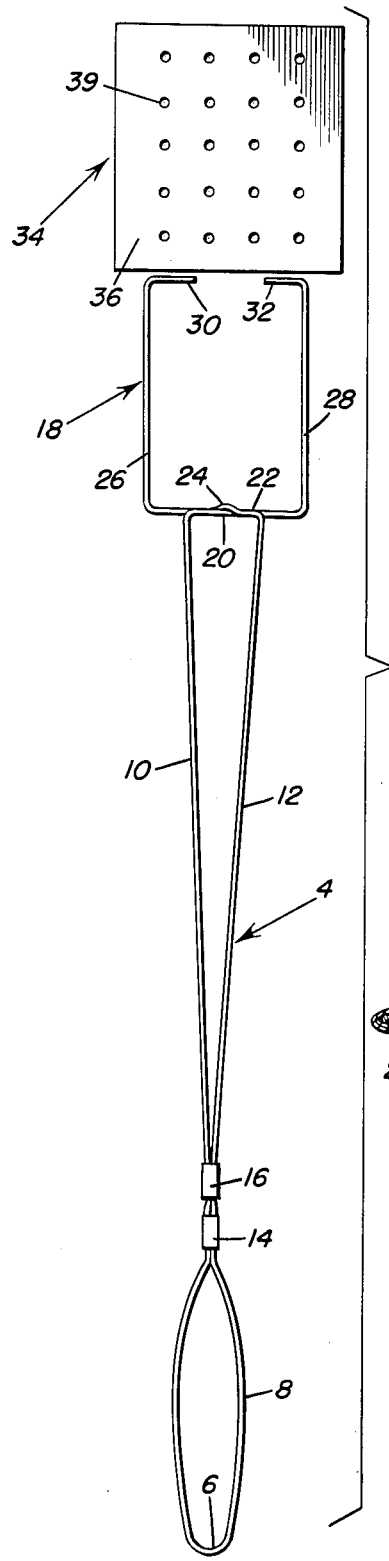
Figure 1 is an elevational view showing the fly swatter with the head-forming envelope removed, and with the adapter frame contracted.
Figure 2:
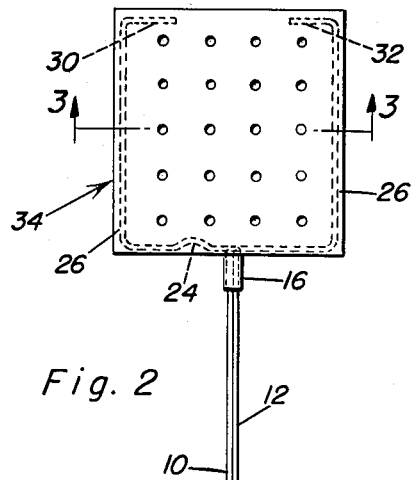
Figure 2 is a similar view with the head on the adapter frame and with the latter completely expanded to hold the head removably in place.
Figure 3:
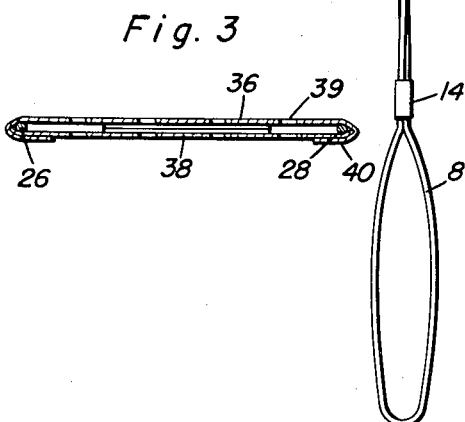
Figure 3 is a section on the line 3—3 of Figure 2, looking in the direction of the arrows.

Referring now to the drawings, the handle unit 4 is preferably made from a single length of wire which is bent upon itself intermediate its ends, as at 6, and then fashioned into a loop-shaped hand grip 8. The portions beyond the hand grip provide openable and closable resilient limbs or arms 10 and 12. These are crossed adjacent to the permanently fixed ferrule 14. There is a slidable sleeve 16 which may be manually shifted in and out on the limbs to open and close the same in an obvious manner. The inherent tension or springiness of the limbs is such that they normally spring apart so as to provide a normally contracted adapter frame 18. This is accomplished by bending the limb 10 laterally to the right, as at 20, and the limb 12 laterally to the left, as at 22. These bent portions cross each other, as at the point 24. The free ends of the laterally bent portions are then bent to form parallel spaced arms, as at 26 and 28, and these have inturned free terminals 30 and 32. By placing the sleeve 16 in the retracted position shown in Figure 1, the adapter frame contracts to the position shown in Figure 1. This permits the sanitary head or envelope 34 to be readily applied or removed, as the case may be. When the sleeve is slid to the extended position shown in Figure 2, the frame is then expanded and the envelope-like head is securely maintained in place for regular fly swatting purposes. The envelope is made up of front and back plies 36 and 38, as shown in Figure 3, having apertures or holes 39 therein, and having their marginal edge portions suitably overlapped and attached in envelope-forming relationship, as at 40. Thus, an envelope which is open at one end is provided, and the paper or other sheet of material is impregnated with a suitable germicide, providing a disposable, sanitary-type fly swatter head. The head may be removed and replaced whenever necessary or desired.

It will be seen from the disclosure that the subject matter of the invention has to do with a simple, practical, economical and handily usable fly swatter, one which is unique in that it is characterized by a bent wire unit 4 having crossed limbs 10 and 12 having their intermediate bent portions formed into a loop-like hand grip and having their free end portions so shaped as to provide a substantially rectangular openable and closable adapter frame 18. This provides a satisfactory mount for the attachable and detachable head, that is, the disposable sanitary envelope 34.

Since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A fly swatter comprising a handle unit formed from wire having a bend between its ends and fashioned at the bend into a loop-like hand grip and further fashioned into a pair of expansible and contractible elongate limbs, a ferrule snugly embracing the inner end portions of said limbs adjacent to and fixedly closing the loop of said hand grip and binding the embraced portions of the limbs firmly together, said limbs being resilient, linearly straight from end to end and normally biased to expand and thus spread the limbs apart into outwardly divergent relationship, the outer end portions of the wire beyond the outer ends of the respective limbs having lateral bends in directions away from said limbs and crossing intermediate their ends, and provided with parallel spaced arms having inwardly directed terminals spaced away from each other and defining a resilient expansible and contractible frame, said frame being normally contracted, a rigid metal manually regulable sleeve slidably mounted on said limbs and shiftable from a position adjacent to said ferrule to a position abutting said frame for contracting and moving the limbs toward and from each other and for thus mechanically and positively spreading and maintaining the frame in its extreme expanded state, and a readily attachable and detachable swatter head of an open-ended envelope type adapted to be removably mounted on and held in place on said frame by the inherent retention properties of the component parts of said frame.

2. A fly swatter comprising a handle unit formed from wire having a bend between its ends and fashioned at the bend into a loop-like hand grip and further fashioned into a pair of expansible and contractible elongate limbs, a ferrule snugly embracing the inner end portions of said limbs adjacent to and fixedly closing the loop of said hand grip and binding the embraced portions of the limbs firmly together, said limbs being resilient, linearly straight from end to end and normally biased to expand and thus spread the limbs apart into outwardly divergent relationship, the outer end portions of the wire beyond the outer ends of the respective limbs having lateral bends in directions away from said limbs and crossing intermediate their ends, and provided with parallel spaced arms having inwardly directed terminals spaced away from each other and defining a resilient expansible and contractible frame, said frame being normally contracted, a rigid metal manually regulable sleeve slidable mounted on said limbs and shiftable from a position adjacent to said ferrule to a position abutting said frame for contracting and moving the limbs toward and from each other and for thus mechanically and positively spreading and maintaining the frame in its extreme expanded state, and a readily attachable and detachable swatter head, said head being an envelope which is made of sheet material which is impregnated with a germicide, said envelope being substantially rectangular and conforming to the expanded shape of said frame, said envelope being highly apertured to function as a satisfactory swatter head and closed along three marginal edges and open along the other marginal edge to provide a mouth through which said frame is insertable and removable, said frame fitting into the interior of said head and the aforementioned parallel arms resiliently engaging the adjacent surfaces of the head to frictionally and clampingly hold the head on the frame.

References Cited in the file of this patent

UNITED STATES PATENTS

| | | |
|---|---|---|
| 345,169 | Nolan | July 6, 1886 |
| 351,424 | Childs | Oct. 26, 1886 |
| 407,311 | Weidig | July 16, 1889 |
| 578,518 | Jones | Mar. 9, 1897 |
| 1,407,102 | Viden | Feb. 21, 1922 |
| 1,692,652 | Habbart | Nov. 21, 1928 |
| 2,014,027 | Newhausen | Sept. 10, 1935 |
| 2,209,260 | Cummings | July 23, 1940 |
| 2,441,290 | Rimer | May 11, 1948 |
| 2,686,329 | King | Aug. 17, 1954 |

FOREIGN PATENTS

| | | |
|---|---|---|
| 14,751 | Great Britain | 1888 |